United States Patent
Peer et al.

(10) Patent No.: US 9,967,265 B1
(45) Date of Patent: May 8, 2018

(54) DETECTING MALICIOUS ONLINE ACTIVITIES USING EVENT STREAM PROCESSING OVER A GRAPH DATABASE

(71) Applicant: EMC Corporation, Hopkinton, MA (US)

(72) Inventors: Oded Peer, Raanana (IL); Oleg Freylafert, Hod Hasharon (IL); Anton Khitrenovich, Kfar-Yona (IL); Yana Vaisman, Netanya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

(21) Appl. No.: 14/869,146

(22) Filed: Sep. 29, 2015

(51) Int. Cl.
*H04L 29/06* (2006.01)

(52) U.S. Cl.
CPC .......... *H04L 63/1416* (2013.01); *H04L 63/20* (2013.01)

(58) Field of Classification Search
CPC ............................ H04L 63/1416; H04L 63/20
See application file for complete search history.

(56) References Cited

U.S. PATENT DOCUMENTS

| | | | | |
|---|---|---|---|---|
| 7,774,361 B1 * | 8/2010 | Nachenberg | ...... | G06F 17/30306 707/779 |
| 7,793,835 B1 * | 9/2010 | Coggeshall | .......... | G06F 21/552 235/375 |
| 8,316,438 B1 * | 11/2012 | Bush | ....... | H04L 12/66 726/22 |
| 8,595,789 B2 * | 11/2013 | Warn | ...... | G06F 21/55 709/223 |
| 9,087,088 B1 | 7/2015 | Bose et al. | | |
| 9,129,039 B2 | 9/2015 | Brettin et al. | | |
| 9,225,730 B1 * | 12/2015 | Brezinski | ............... | G06F 21/00 |
| 9,325,732 B1 | 4/2016 | Stickle et al. | | |
| 9,330,416 B1 * | 5/2016 | Zaslaysky | .............. | G06Q 40/12 |
| 9,509,688 B1 * | 11/2016 | Magi Shaashua | .. | H04L 63/0861 |
| 9,635,049 B1 * | 4/2017 | Oprea | ................... | H04L 63/145 |
| 9,736,182 B1 * | 8/2017 | Madhukar | .............. | H04L 63/20 |
| 9,742,788 B2 * | 8/2017 | Hassanzadeh | ...... | H04L 63/1416 |
| 9,838,407 B1 * | 12/2017 | Oprea | ................. | H04L 63/1416 |
| 9,866,573 B2 * | 1/2018 | Kozlovsky | ............ | G06F 21/566 |
| 2006/0085163 A1 * | 4/2006 | Nader | ................... | H04W 36/32 702/178 |

(Continued)

OTHER PUBLICATIONS

Bocchi—"Network Connectivity Graph for Malicious Traffic Dissection," 2015 24th International Conference on Computer Communication and Networks (ICCCN), Aug. 6, 2015, pp. 1-9.*

(Continued)

*Primary Examiner* — James Turchen
*Assistant Examiner* — James J Wilcox
(74) *Attorney, Agent, or Firm* — BainwoodHuang

(57) ABSTRACT

Techniques of detecting malicious events involve generating a relational graph of event data describing events that occur within a specified, limited time window. Along these lines, a malicious event detection computer receives event data describing interactions between entities such as users, devices, and network domains from various servers that occur within a specified time window. In response, the malicious event detection computer generates a relational graph that has graph structures (e.g., nodes and edges) representing these interactions. Analysis of patterns within the resulting relational graph indicates whether there is a malicious event occurring.

9 Claims, 4 Drawing Sheets

Malicious Activity Detection Engine 138

Fraudulent Event 310

(56) References Cited

U.S. PATENT DOCUMENTS

| | | | |
|---|---|---|---|
| 2009/0070638 A1* | 3/2009 | Huang | G06F 11/076 714/57 |
| 2010/0235879 A1* | 9/2010 | Burnside | H04L 63/0263 726/1 |
| 2012/0143813 A1* | 6/2012 | B'Far | G06N 5/02 706/52 |
| 2013/0254193 A1* | 9/2013 | Heidasch | G06F 17/30958 707/736 |
| 2013/0326048 A1* | 12/2013 | Heidasch | G06N 5/02 709/224 |
| 2014/0222826 A1 | 8/2014 | DaCosta et al. | |
| 2015/0244734 A1* | 8/2015 | Olson | G06F 21/577 726/25 |
| 2015/0281248 A1* | 10/2015 | Obbard | H04L 63/101 726/1 |
| 2015/0326589 A1* | 11/2015 | Smith | H04L 63/02 726/1 |
| 2015/0356408 A1 | 12/2015 | Faith et al. | |
| 2015/0356412 A1 | 12/2015 | Faith et al. | |
| 2015/0356441 A1 | 12/2015 | Faith et al. | |
| 2015/0381649 A1* | 12/2015 | Schultz | H04L 63/1433 726/25 |
| 2016/0110409 A1* | 4/2016 | Rao | G06F 3/0638 707/696 |
| 2016/0112440 A1* | 4/2016 | Kolton | G06F 21/567 726/1 |
| 2017/0017679 A1* | 1/2017 | Jurowicz | G06F 17/30377 |
| 2017/0063896 A1* | 3/2017 | Muddu | H04L 63/1425 |
| 2017/0063910 A1* | 3/2017 | Muddu | H04L 63/1425 |
| 2017/0127466 A1* | 5/2017 | Narasimha | H04W 16/18 |
| 2017/0300690 A1* | 10/2017 | Ladnai | G06F 21/56 |

OTHER PUBLICATIONS

Liu—"Detecting Malicious Clients in ISP Networks Using HTTP Connectivity Graph and Flow Information," 2014 IEEE/ACM International Conference on Advances in Social Networks Analysis and Mining (ASONAM 2014), Aug. 17-20, 2014, pp. 150-157.*

Nikolopoulous—"A Graph-Based Model for Malicious Code Detection Exploiting Dependencies of System Call Groups," Jun. 25-26, 2015, pp. 228-235.*

Kim—"Detection of Unknown Malicious Script Code using a Conceptual Graph & SVM," RACS '12, Proceedings of 2012 ACM Research in Applied Computation Symposium, pp. 310-315.*

* cited by examiner

US 9,967,265 B1

DETECTING MALICIOUS ONLINE ACTIVITIES USING EVENT STREAM PROCESSING OVER A GRAPH DATABASE

BACKGROUND

Cybersecurity refers to the imposition of protective measures against unauthorized access or use of sensitive electronic data. Without such measures, attackers would be able to carry out various forms of cybercrime such as performing unauthorized transactions and stealing confidential information.

A conventional approach to providing cybersecurity is to authenticate users before allowing the users to access or use sensitive electronic data. For example, users may need to provide authentication factors such as passwords, personal identification numbers (PINs), biometrics, etc. from their user computers before receiving access to sensitive electronic data.

SUMMARY

Unfortunately, there are deficiencies to the above described conventional approach to providing cybersecurity which simply requires users to supply authentication factors before providing access to sensitive electronic data. For example, such an approach does not detect certain patterns of malicious activity such as an unauthorized user trying to login using different usernames from the same machine.

In contrast to the above-described conventional approach to providing cybersecurity, improved techniques involve generating a relational graph of event data describing events that occur within a specified, limited time window. Along these lines, a malicious event detection computer receives event data describing interactions between entities such as users, devices, and network domains from various servers that occur within a specified time window. In response, the malicious event detection computer generates a relational graph that has graph structures (e.g., nodes and edges) representing these interactions. Analysis of patterns within the resulting relational graph indicates whether there is a malicious event occurring.

Advantageously, the improved techniques allow for detection a pattern of malicious activity such as an unauthorized user trying to login using different usernames from the same machine. Further, the improved techniques provide a less uncertainty in the scope of an investigation because the amount of data is naturally limited by the specified time window.

One embodiment of the improved techniques is directed to a method of detecting a malicious event. The method includes receiving event data describing interactions between entities. The method also includes, in response to receiving all of the event data, generating a relational graph that includes graph structures representing the interactions between the entities. The method further includes performing a malicious event detection operation on the relational graph, the malicious event detection operation providing, as output, a malicious event detection result indicating whether an interaction between the entities is involved in a malicious event.

Additionally, some embodiments are directed to an apparatus constructed and arranged to detect a malicious event. The apparatus includes a network interface, memory and controlling circuitry coupled to the memory. The controlling circuitry is constructed and arranged to carry out a method of detecting a malicious event.

Further, some embodiments are directed to a computer program product having a non-transitory, computer-readable storage medium which stores executable code, which when executed by a controlling circuitry, causes the controlling circuitry to perform a method of detecting a malicious event.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry that are involved in providing a rule to detect malicious activity.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of detecting malicious events involve generating a relational graph of event data describing events that occur within a specified, limited time window. Along these lines, a malicious event detection computer receives event data describing interactions between entities such as users, devices, and network domains from various servers that occur within a specified time window. In response, the malicious event detection computer generates a relational graph that has graph structures (e.g., nodes and edges) representing these interactions. Analysis of patterns within the resulting relational graph indicates whether there is a malicious event occurring.

Advantageously, the improved techniques allow for prevention of malicious activities from being carried out by detecting such activities as they are occurring. Further, the improved techniques provide a less uncertainty in the scope of an investigation because the amount of data is naturally limited by the specified time window.

Figure 1:
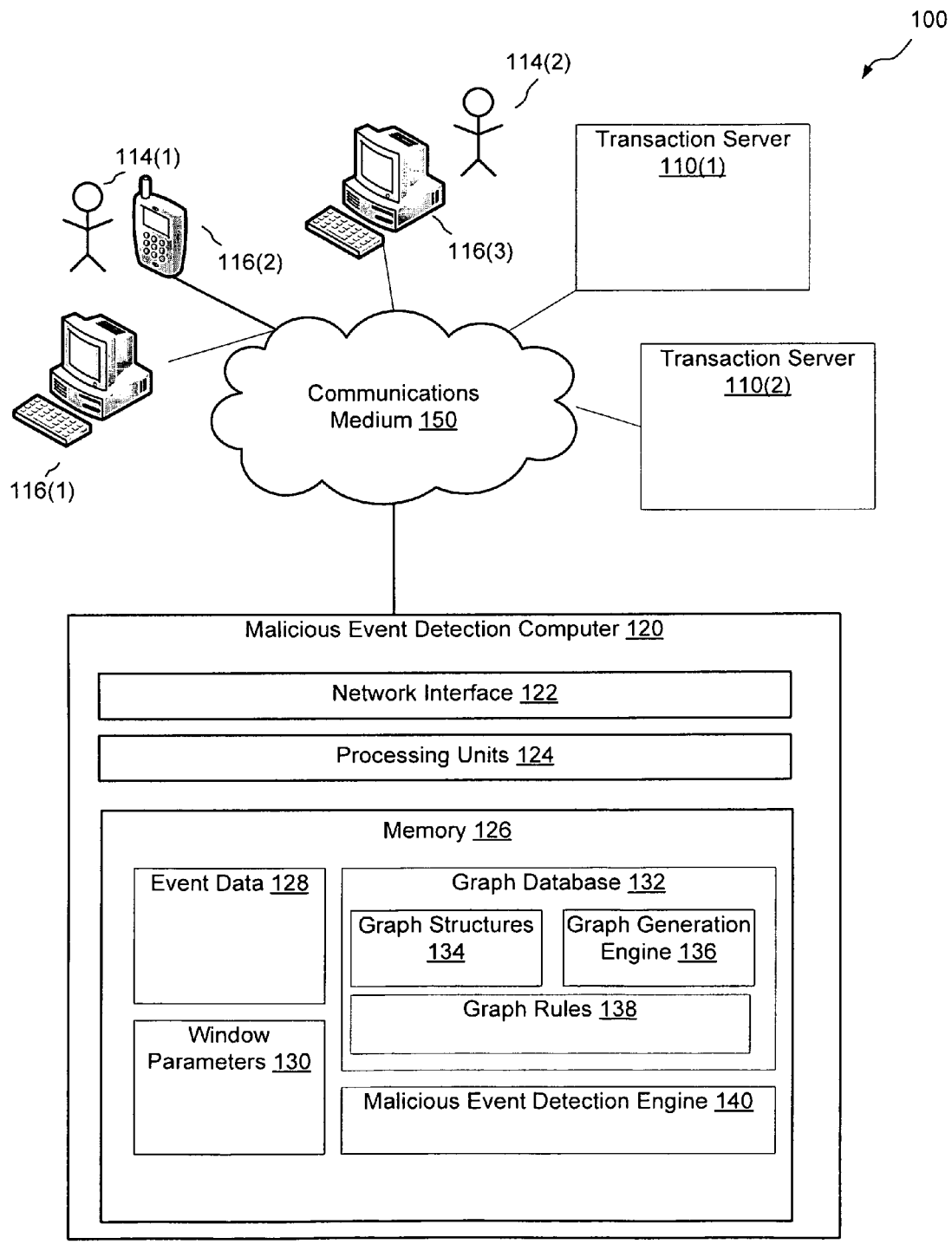
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes electronic devices 116(1), 116(2), 116(3), transaction servers 110(1), 110(2), malicious event detection computer 120, and communications medium 150.

Each transaction server 110(1) and 110(2) is constructed and arranged to receive communications from electronic devices such as electronic devices 116(1), 116(2), 116(3) and perform some function with those communications. For example, transaction servers 110(1) and 110(2) may each represent a web server that hosts a website. In that case, the electronic communications may represent login data such as usernames and passwords.

Each electronic device 116(1), 116(2), 116(3) is capable of sending electronic communications to transaction servers 110(1), 110(2) via software such as a browser or a specialized app. As illustrated in FIG. 1, electronic devices 116(1) and 116(3) are computers and electronic device 116(2) is a mobile phone. Each electronic device 116(1), 116(2), 116(3) may be operated by either user 114(1) and 114(2). It should be understood that there might be any number of electronic devices sending communications to any number of transaction servers.

The malicious event detection computer 120 is constructed and arranged to receive event data from servers such as transaction servers 110(1) and 110(2) and deduce whether any of the event data obeys a pattern indicative of malicious events. As illustrated in FIG. 1, the malicious event detection computer 120 includes a network interface 122, a processor 124, and memory 126. The network interface 122 includes, for example, adapters, such as SCSI target adapters and network interface adapters, for converting electronic and/or optical signals received from the communications medium 150 to electronic form for use by the rule server computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, event data 128, window parameters 130, and graph structures 134 and rules 138 in a graph database 132. The memory 126 is further constructed and arranged to store a variety of software constructs realized in the form of executable instructions, such as a graph generation engine 136 in the graph database 132 and a malicious event detection engine 140. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The event data 128 includes data identifying individual events as experienced by the transactions servers 110(1) and/or 110(2). For example, a single event at the transaction server 110(1) might be a login event in an attempt to access a private web domain. The event data 128 associated with that event might contain a username, a password, device browser information from device 114(1), a timestamp, and so on. In this case, the event data 128 describes an interaction between entities such as a user defined by the username, a device defined by the browser information, and the private web domain.

The window parameters 130 define the temporal window over which event data is graphed by the graph generation engine 136. For example, the temporal window may be characterized by a width in time. Typically, this means that, as new event data is received by the computer 120 and is added to a relational graph, data too old as specified by the window parameters 130 are deleted from the graph. In this way, interactions described by event data 128 that occur within that width in time may be included in a relational graph. In some arrangements, rather than a width in time, the temporal window may instead be characterized by a number of events whose interactions are included in a relational graph.

The graph structures 134 represent the interactions between the entities represented by the event data 128. For example, entities such as user 114(1), electronic device 116(1), and a web domain may be represented as nodes or vertices of a relational graph. Further, the interaction between the user 114(1) and electronic device 116(1), and the interaction between the electronic device 116(1) and the web domain may each be represented by an edge of the relational graph. Each graph structure 134 may contain metadata that controls its behavior. For example, each node and edge may contain the timestamp that was received as part of the event data 128. Further, each node may contain attributes describing the entities it represents. Along these lines, a node representing a web domain may be either accessible or blocked.

The graph generation engine 136 causes the processing units 124 to generate a relational graph from the graph structures 134. In doing so, the graph generation engine 136 examines the metadata of the graph structures 134 to decide whether to include those graph structures 134 in a relational graph. For example, when the timestamp included in a graph structure 134 indicates that the graph structure 134 represents an interaction that is old enough to be outside the time window, the graph generation engine 136 will not consider that interaction in the relational graph.

The malicious event detection engine 140 causes the processing units 124 to evaluate a relational graph for the presence of patterns indicative of malicious events. For example, the malicious event detection engine 140 evaluates the structure of a relational graph against a set of relational rules 138. For example, a relational rule 138 may state that if a user attempts to access two separate blocked web domains within an hour, then the malicious event detection computer 120 should issue an alert to an interested third party, e.g., the transaction server 110(1) that sent the event data 128 leading to the alert.

The communications medium 150 provides network connections among the malicious activity detection systems 110 and the rule server computer 120. Communications medium 150 may implement any of a variety of protocols and topologies that are in common use for communications over the Internet. Furthermore, communications medium 150 may include various components (e.g., cables, switches/routers, gateways/bridges, etc.) that are used in such communications.

During operation, the transaction servers 110(1) and 110(2) receive communications from electronic devices 114(1), 114(2), and 114(3). In response, the transaction servers 110(1) and 110(2) send activity data 128 compiled from the received communications to the malicious event detection computer 120.

In some arrangements, the event data 128 sent from the transaction servers 110(1) and 110(2) form a continuous stream of data as the event data arrives at the malicious event detection computer 120. In this case, from a practical perspective, each separate event represented by a single event datum 128 might have an identifier marking the beginning and end of that event.

Accordingly, upon receiving an event datum 128 and storing the event datum 128 in memory 126, the malicious event detection computer 120 invokes the graph generation engine 136 to construct graph structures 134 (e.g., nodes and edges) that represent the entities and interactions from the event datum 128.

When there is currently no graph generated for the stream of event data 128 being received by the malicious event detection computer 120, then the graph generation engine 136 generates a new graph upon receiving the first event datum 128. Specifically, the graph generation engine 136 creates the graph structures 134 and arranges the graph structures according to the interactions described in the event data 128.

As the malicious event detection computer 120 receives a new event datum 128 at some particular time, the graph generation engine 136 creates graph structures 134 for that new event datum 128 and adds the new graph structures to the existing relational graph. Further, upon receiving that new event datum 128, the graph generation engine 136 inspects the timestamps of each graph structure 134 that is currently part of the relational graph. If any graph structures have a timestamp indicating a time difference from the particular time greater than the difference specified in the window parameters 130, then the graph generation engine 136 deletes those graph structures from the relational graph.

After the graph generation engine 136 adds new graph structures 134 and deletes old graph structures 134 from the relational graph, the malicious activity detection engine 140 applies pattern detection schemes using the rules 138 to identify those graph structures 134 representing entities and interactions that are involved in a malicious event.

If at some point the malicious activity detection engine 140 identifies such graph structures, then the malicious event detection computer 120 may take a remedial action concerning the source of the event data from which the graph structures were derived, e.g., placing an electronic device identifier on a blacklist, sending an alert to a transaction server 110(1), etc.

Figure 2:
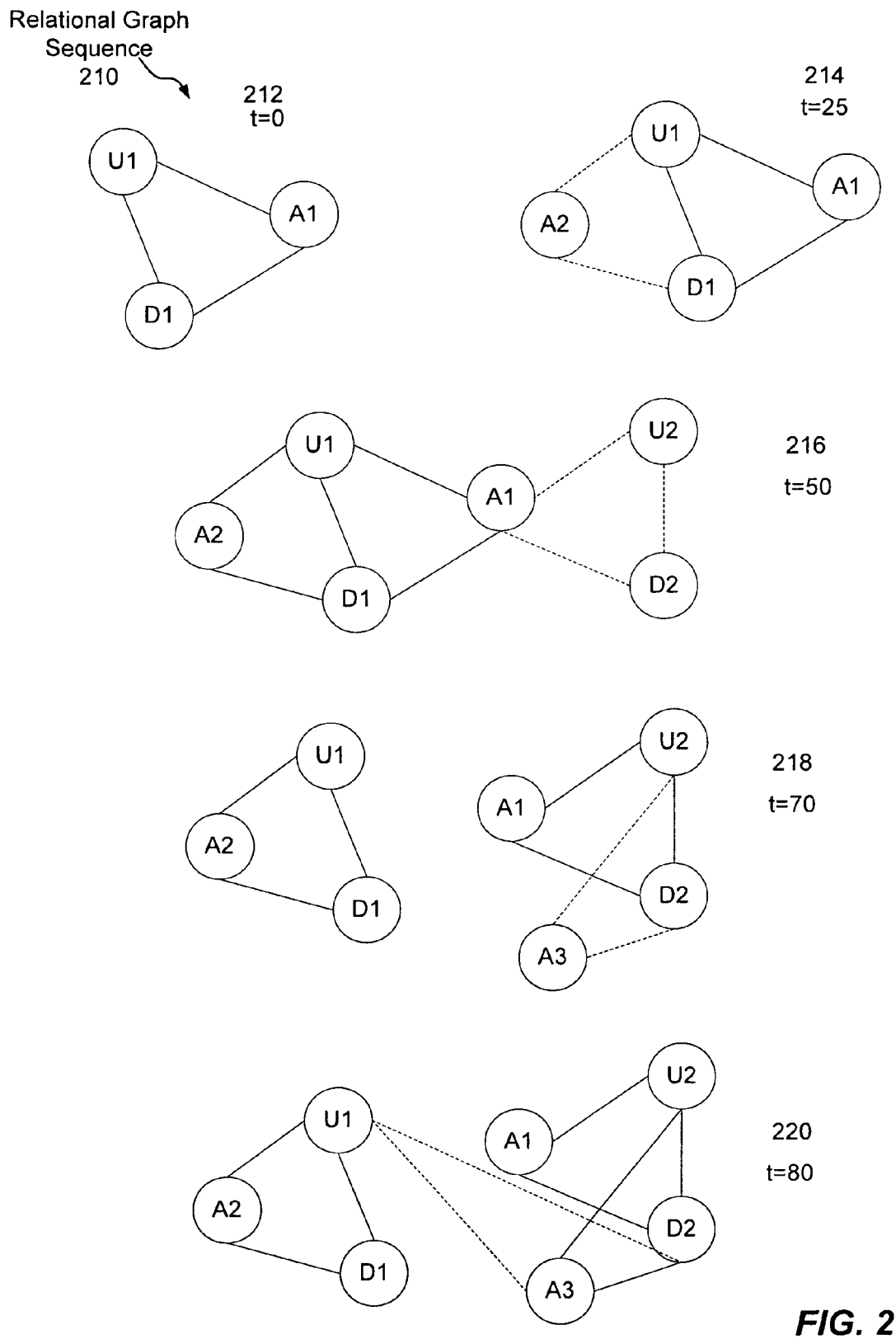
FIG. 2 is an example set of graphs evolving over time as processed within the electronic environment illustrated in FIG. 1.

FIG. 2 illustrates an example sequence 210 of relational graphs generated in the manner described above. In this example, a user ("U1") uses a device ("D1") to access a web domain ("A1"). Further, there is a rule 138 stating that a single user using two distinct devices to access two blocked web domains within an hour indicates a malicious event. Thus, in this example a one-hour time window is considered.

At 212, this event data is received at a time corresponding to t=0 minutes. The relational graph thus generated has three nodes labeled as U1, D1, and A1 with edges representing pairwise interactions.

At 214, at t=25 minutes, the computer 120 receives new event data 128 indicating that the user U1 used the device D1 to access another web domain A2. A2 is a blocked domain. Dotted lines denote the edges added to the relational graph.

At 216, at t=50 minutes, the computer 120 receives new event data 128 indicating that another user U2 has accessed the web domain A1 using another device D2.

At 218, at t=70 minutes, the user A2 attempted to access a blocked web domain A3 using the device D2. Also, the edges graphed at t=0 has been deleted from the relational graph because that interaction represented by those edges has expired.

At 220, at t=80 minutes, the user U1 used the device D2 to attempt to access the blocked web domain A3. Here the malicious activity detection engine 140 matches this relational graph with the above-described rule. (Note that U1's access of separate blocked domains A2 and A3 using separate devices D1 and D2 occurred 55 minutes from each other.) Because U1 was found to be in violation of this rule, the computer 120 may notify a transaction server 110(1) from which the event data 128 originated so that the server 110(1) may take remedial action against user U1.

It should be understood that the malicious activity detection engine 140 might be configured to draw further conclusions about the graph at 220. For example, because both users U1 and U2 used the device D2 to attempt access of blocked domain A3, the malicious activity detection engine 140 may also take remedial action against user U2. Whether the remedial action taken against U2 is the same as that taken against U1 is a policy decision. However, one option is to weight such an action according to distance.

Figure 3:
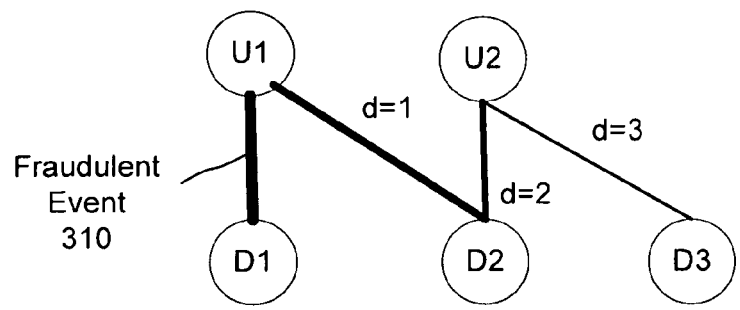
FIG. 3 is an example graph as processed within the electronic environment illustrated in FIG. 1.

FIG. 3 illustrates an example of a distance in a relational graph 310 applied to edges. In this case, there are two users U1 and U2 and three devices D1, D2, and D3. User U1 interacts with devices D1 and D2, while user U2 interacts with devices D2 and D3. Further, suppose that information has been received indicating that an event involving the interaction of the user U1 with the device D1 was malicious. This indication is represented by a very thick edge in the graph 310. Other edges close to this malicious edge may be marked as suspicious depending on the distance from the malicious edge.

For the purpose of relational graphs, distance between edges is defined in terms of common nodes. For example, an edge that shares a node in common with the malicious edge is at a distance of one from the malicious edge. Another edge that shares a node in common with the edge at a distance of one from the malicious edge is assigned a distance of two from the malicious edge. For simplicity, all other edges are at a distance of three from the malicious edge.

In the graph 310, the edge representing the interaction between the user U1 and the device D2 is a distance of one from the malicious edge. The edge representing the interaction between the user U2 and the device D2 is a distance of two from the malicious edge. The edge representing the interaction between the user U2 and the device D3 is at a distance of three from the malicious edge. In this case, the malicious activity detection engine 140 might mark the interaction between the user U1 and the device D2 as being of a high level of risk, the interaction between the user U2 and the device D2 being at a medium level of risk, and the interaction between the user U2 and the device D3 being at a low level of risk.

It should be understood that the prior art techniques are unable to perform this level of analysis on interactions related to other, malicious interactions in real-time as presented here. By using relational graphs over a limited number of event structures, the malicious activity detection engine 140 may use the concept of distance in relational graphs to define remedial actions to take simply from the topology of the relational graph.

Figure 4:
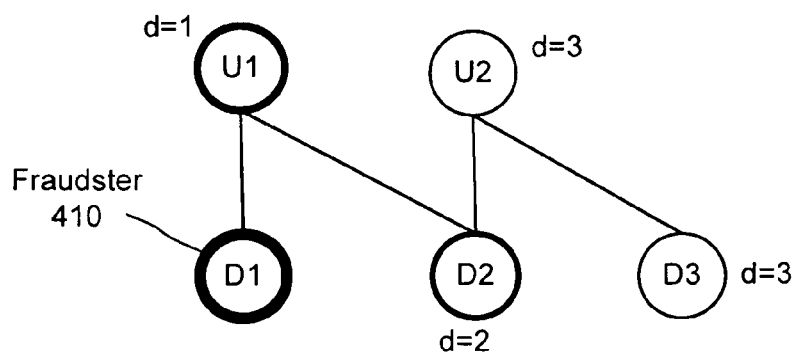
FIG. 4 is an example graph as processed within the electronic environment illustrated in FIG. 1.

FIG. 4 illustrates an example of a distance in a relational graph 410 applied to nodes. Again, there are two users U1 and U2 and three devices D1, D2, and D3. User U1 interacts with devices D1 and D2, while user U2 interacts with devices D2 and D3. Further, suppose that information has been received indicating that device D1 was found to be a source of malicious events. (For example, device D1 could be the source of denial-of-service attacks.) This indication is represented by a very thick node wall in the graph 410 for user U1. Other nodes close to this malicious node may be marked as suspicious depending on the distance from the malicious node.

For the purpose of relational graphs, distance between modes is defined in terms of common edges. For example, a node that shares an edge in common with the malicious node is at a distance of one from the malicious node. Another node that shares an edge in common with the node at a distance of one from the malicious node is assigned a distance of two from the malicious node. For simplicity, all other nodes are at a distance of three from the malicious node.

In the graph 410, the node representing the user U1 is a distance of one from the node representing the malicious device D1. The node representing the device D2 is a distance of two from the node representing the malicious device D1. The nodes representing the user U2 and the device D3 are at a distance of three from the node representing the malicious device D1. In this case, the malicious activity detection engine 140 might mark events involving the user U1 as being of a high level of risk, the device D2 being at a medium level of risk, and the user U2 and the device D3 being at a low level of risk.

Figure 5:
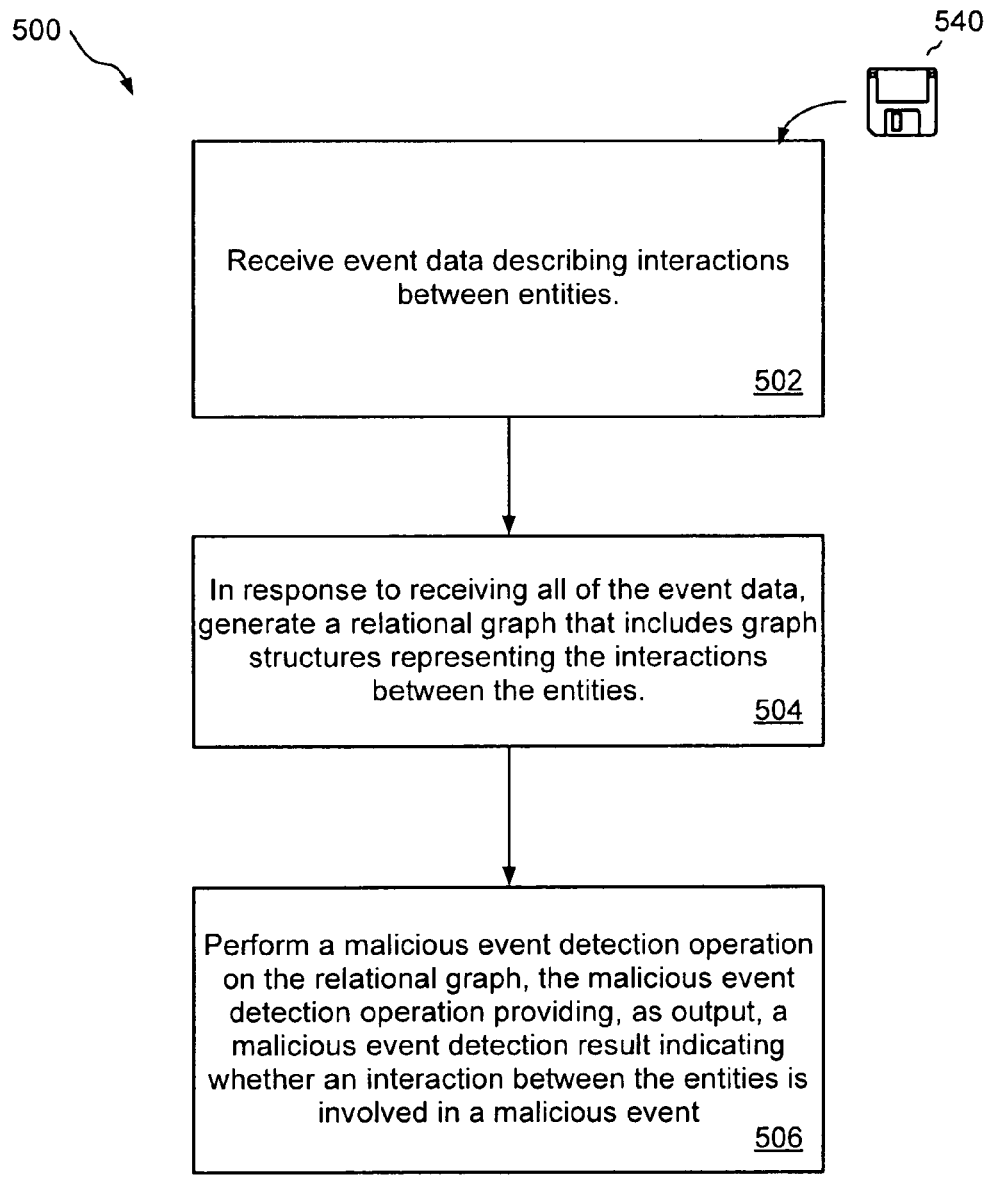
FIG. 5 is a flow chart illustrating a method of carrying out the improved technique within the electronic environment illustrated in FIG. 1.

FIG. 5 illustrates an example method of detecting a malicious event according to the improved techniques. The method 500 may be performed by the software constructs described in connection with FIG. 1, which reside in the memory 126 of the malicious activity detection computer 120 and are run by the processing units 124.

At 502, event data describing interactions between entities is received. For example, the malicious activity detection computer 120 receives activity data 134. The activity data 134 may describe, for example, a user accessing a web domain with a device.

At 504, in response to receiving the event data, a relational graph that includes graph structures representing the interactions between the entities is generated. For example, the malicious activity detection computer 120 produces a relational graph based on the interactions. In some arrangements, these interactions occur within a temporal window. In that case, the computer 120 may delete graph structures from the relational graph corresponding to those interactions that have expired, i.e. occurred outside the temporal window.

At 506, a malicious event detection operation is performed on the relational graph, the malicious event detection operation providing, as output, a malicious event detection result indicating whether an interaction between the entities is involved in a malicious event. For example, the malicious event detection engine 140 compares the topology of the relational graph to that described in a set of rules 138.

Improved techniques of detecting malicious events involve generating a relational graph of event data describing events that occur within a specified, limited time window. Along these lines, a malicious event detection computer receives event data describing interactions between entities such as users, devices, and network domains from various servers that occur within a specified time window. In response, the malicious event detection computer generates a relational graph that has graph structures (e.g., nodes and edges) representing these interactions. Analysis of patterns within the resulting relational graph indicates whether there is a malicious event occurring.

While various embodiments of the present disclosure have been particularly shown and described, it will be understood by those skilled in the art that various changes in form and details may be made therein without departing from the spirit and scope of the present disclosure as defined by the appended claims.

For example, although the example presented herein concerned threat detection, the framework provided may be applied to other areas such as fraud detection. Further, although the examples shown herein are directed toward a rules-based approach to pattern matching, model-based approaches that produce numerical risk scores may also be used.

Also, the example provided above concerned the specification of a time window 130. However, in some arrangements, no such time window needs to be specified. For example, incoming events may drive the generation of a new graph. In such a case, as the malicious activity detection computer 120 receives new event data, the graph generation engine 136 adjusts a graph by adding new graph structures associated with the new event data to the graph and deleting graph structures associated with the oldest event data from the graph.

Further, the example provided above may be seen as event stream processing over a graph database. Along these lines, rather than mine through a plethora of data as in big-data analytics, the improved techniques can provide a framework for treating a stream of event data by adding new graph structures and deleting old graph structures of a graph as new event data arrives. One may tune the number of graph structures present in a graph at any particular time such that there are enough graph structures to detect malicious activity with a reasonable likelihood, but at the same time limiting the number of graph structures so that the malicious activity detection computer 120 may analyze the graph in a reasonable amount of time.

Furthermore, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 540 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A computer-implemented method of detecting a malicious event, the computer-implemented method comprising:

receiving, by processing circuitry, event data describing interactions between entities;

in response to receiving the event data, generating, by the processing circuitry, a relational graph that includes graph structures representing the interactions between the entities, the graph structures including nodes and edges connected to a pair of nodes, each node representing an entity, each edge representing an interaction between a pair of entities, each graph structure including a timestamp indicating a time at which an interaction between the entities took place;

receiving, at a particular time, a new event datum describing an interaction between new entities;

initiating, by the new event datum for each graph structure, (i) determining a time difference between the time indicated by the timestamp and the particular time, and (ii) determining whether the time difference exceeds a specified time difference;

having determined whether the time difference exceeds the specified time difference, (i) adding a new graph structure representing the interaction between the new entities to the relational graph, and (ii) deleting each of a set of graph structures for which the time difference exceeds the specified time difference; and after adding and deleting, performing a malicious event detection operation on the relational graph, the malicious event detection operation providing, as an output, a malicious event detection result indicating whether the interaction between the new entities is part of a malicious event;

receiving an indication that a particular edge represents an interaction that is part of a fraudulent transaction;

wherein the performing of the malicious event detection operation includes, for each edge of the relational graph:

generating a distance from the particular edge to that edge; and indicating a likelihood that that edge represents the interaction that is part of the fraudulent transaction based on the distance, wherein the generating of the distance includes:

setting the distance to one (1) when that edge and the particular edge are connected to a common node;

setting the distance to two (2) when that edge and an edge at a distance of one (1) from the particular edge have a common node; and setting the distance to three (3) for all other edges; and wherein the indicating of the likelihood includes:

marking that edge as suspicious with high confidence when the distance from the particular edge to that edge is one (1);

marking that edge as suspicious with low confidence when the distance from the particular edge to that edge is two (2); and not marking that edge as suspicious when the distance from the particular edge to that edge is three (3).

2. A computer-implemented method as in claim 1, wherein the graph structures include nodes and edges connected to a pair of nodes, each node representing an entity, each edge representing an interaction between a pair of entities;

wherein deleting each of the set of graph structures includes removing an edge from the relational graph.

3. A computer-implemented method as in claim 2, further comprising receiving a set of rules, each of the set of rules specifying a logical condition that, when satisfied by the relational graph, indicates that edges of the relational graph represent interactions that are part of a malicious event;

wherein performing the malicious event detection operation on the relational graph includes verifying whether the relational graph satisfies a logical condition specified by the set of rules.

4. A computer program product having a non-transitory computer readable medium which stores a set of instructions to detect malicious activity, the set of instructions, when carried out by computerized circuitry, causing the computerized circuitry to perform a method of:

receiving event data describing interactions between entities;

in response to receiving the event data, generating a relational graph that includes graph structures representing the interactions between the entities, the graph structures including nodes and edges connected to a pair of nodes, each node representing an entity, each edge representing an interaction between a pair of entities, each graph structure including a timestamp indicating a time at which an interaction between the entities took place;

receiving, at a particular time, a new event datum describing an interaction between new entities;

initiating, by the new event datum for each graph structure, (i) determining a time difference between the time indicated by the timestamp and the particular time, and (ii) determining whether the time difference exceeds a specified time difference;

having determined whether the time difference exceeds the specified time difference, (i) adding a new graph structure representing the interaction between the new entities to the relational graph, and (ii) deleting each of a set of graph structures for which the determined time difference exceeds the specified time difference; and after adding and deleting, performing a malicious event detection operation on the relational graph, the malicious event detection operation providing, as an output, a malicious event detection result indicating whether the interaction between the new entities is part of a malicious event;

receiving an indication that a particular edge represents an interaction that is part of a fraudulent transaction;

wherein the performing of the malicious event detection operation includes, for each edge of the relational graph:

generating a distance from the particular edge to that edge; and indicating a likelihood that that edge represents the interaction that is part of the fraudulent transaction based on the distance;

wherein the generating of the distance includes:

setting the distance to one (1) when that edge and the particular edge are connected to a common node;

setting the distance to two (2) when that edge and an edge at a distance of one (1) from the particular edge have a common node; and setting the distance to three (3) for all other edges; and wherein the indicating of the likelihood includes:

marking that edge as suspicious with high confidence when the distance from the particular edge to that edge is one (1);

marking that edge as suspicious with low confidence when the distance from the particular edge to that edge is two (2); and not marking that edge as suspicious when the distance from the particular edge to that edge is three (3).

5. A computer program product as in claim 4 wherein deleting each of the set of graph structures includes removing an edge from the relational graph.

6. A computer program product as in claim 5, further comprising receiving a set of rules, each of the set of rules specifying a logical condition that, when satisfied by the relational graph, indicates that edges of the relational graph represent interactions that are part of a malicious event;
   wherein performing the malicious event detection operation on the relational graph includes verifying whether the relational graph satisfies a logical condition specified by the set of rules.

7. An electronic apparatus, comprising:
   a user interface;
   memory; and
   control circuitry coupled to the user interface and the memory, the memory storing instructions which, when carried out by the control circuitry, cause the control circuitry to:
   receive event data describing interactions between entities;
   in response to receiving the event data, generate a relational graph that includes graph structures representing the interactions between the entities, the graph structures including nodes and edges connected to a pair of nodes, each node representing an entity, each edge representing an interaction between a pair of entities, each graph structure including a timestamp indicating a time at which an interaction between the entities took place;
   receive, at a particular time, a new event datum describing an interaction between new entities;
   initiate, by the new event datum for each graph structure, (i) determine a time difference between the time indicated by the timestamp and the particular time, and (ii) determine whether the time difference exceeds a specified time difference;
   having determined whether the time difference exceeds the specified time difference, (i) add a new graph structure representing the interaction between the new entities to the relational graph, and (ii) delete each of a set of graph structures for which the determined time difference exceeds the specified time difference; and
   after adding and deleting, perform a malicious event detection operation on the relational graph, the malicious event detection operation providing, as an output, a malicious event detection result indicating whether the interaction between the new entities is part of a malicious event;
   receive an indication that a particular edge represents an interaction that is part of a fraudulent transaction;
   wherein the instructions which, when carried out by the control circuitry, further cause the control circuitry to perform the malicious event detection operation, including, for each edge of the relational graph, to:
   generate a distance from the particular edge to that edge; and
   indicate a likelihood that that edge represents the interaction that is part of the fraudulent transaction based on the distance,
   wherein the instructions which, when carried out by the control circuitry, further cause the control circuitry to generate the distance, including, to:
   set the distance to one (1) when that edge and the particular edge are connected to a common node;
   set the distance to two (2) when that edge and an edge at a distance of one (1) from the particular edge have a common node; and
   set the distance to three (3) for all other edges; and
   wherein the instructions which, when carried out by the control circuitry, further cause the control circuitry to indicate the likelihood, including, to:
   mark that edge as suspicious with high confidence when the distance from the particular edge to that edge is one (1);
   mark that edge as suspicious with low confidence when the distance from the particular edge to that edge is two (2); and
   not mark that edge as suspicious when the distance from the particular edge to that edge is three (3).

8. An electronic apparatus as in claim 7, wherein the controlling circuitry constructed and arranged to delete each of the set of graph structures includes removing an edge from the relational graph.

9. An electronic apparatus as in claim 8, wherein the controlling circuitry is further constructed and arranged to receive a set of rules, each of the set of rules specifying a logical condition that, when satisfied by the relational graph, indicates that edges of the relational graph represent interactions that are part of a malicious event;
   wherein the controlling circuitry constructed and arranged to perform the malicious event detection operation on the relational graph is further constructed and arranged to verify whether the relational graph satisfies a logical condition specified by the set of rules.

* * * * *